United States Patent [19]

Petros

[11] 4,435,096

[45] Mar. 6, 1984

[54] SEALING ARRANGEMENT FOR A ROTATABLE MEMBER

[75] Inventor: Andrew J. Petros, Oakdale, Pa.

[73] Assignee: Mesta Machine Company, Pittsburgh, Pa.

[21] Appl. No.: 301,374

[22] Filed: Sep. 11, 1981

[51] Int. Cl.³ .......................... F16C 33/74; F16J 15/32
[52] U.S. Cl. ..................................... 384/147; 384/130; 384/140; 384/153; 277/95
[58] Field of Search ..................... 308/36.1, 36.2, 36.4, 308/187.1, 20; 277/95, 157, 166, 105, 84, 152, 153; 384/130, 140-153

[56] References Cited

U.S. PATENT DOCUMENTS

| | | | |
|---|---|---|---|
| 2,328,676 | 9/1943 | Rich | 308/36.1 |
| 2,868,574 | 1/1959 | Rich, Jr. | 308/36.1 |
| 3,183,046 | 5/1965 | Hyland | 277/95 X |
| 3,832,021 | 8/1974 | Jennings et al. | 308/36.1 |
| 4,063,743 | 12/1977 | Petros | 277/63 |
| 4,234,196 | 11/1980 | Iida | 277/95 X |

Primary Examiner—Stuart S. Levy
Assistant Examiner—Thomas R. Hannon
Attorney, Agent, or Firm—Carothers & Carothers

[57] ABSTRACT

A sealing arrangement for sealing a stationary member to a rotatable member wherein a neck of the rotatable member is coaxially received in a sleeve secured for rotation therewith and the sleeve is journaled for rotation in the stationary member. An extension ring is annularly secured to one end of the sleeve with a normally flat annular thrower seal of elastomeric material annularly engaged between this extension ring and the one end of the sleeve to provide a seal therebetween with inner and outer annular peripheral portions of the thrower seal radially protruding. The inner peripheral portion of the thrower seal annularly engages the neck of the rotatable member under elastic deformation to provide an annular static seal and a peripheral side face of the outer peripheral portion of the thrower seal annularly engages an annular seal rubbing surface of the stationary member under elastic deformation to provide an annular rubbing seal therebetween. A second annular rubbing seal may be positioned between the stationary member and the aforesaid extension ring to provide a second rubbing seal therebetween, with the second rubbing seal and the aforesaid thrower seal being relatively closely spaced to form an annular and continuous seal passage therebetween. This second rubbing seal may take on a configuration similar to that of the thrower seal, and drain passages are provided in the annular and continuous seal passage between the two seals.

11 Claims, 3 Drawing Figures

SEALING ARRANGEMENT FOR A ROTATABLE MEMBER

The present invention relates to a sealing arrangement for a rotatable member, and more particularly to a sealing arrangement for minimizing or preventing altogether the leakage of oil or other lubricant from the bearings of a rotatable member and for preventing entry of foreign matter.

The sealing arrangement of the present invention is especially adapted for reduction of loss of lubricant and the introduction of foreign matter with respect to the back-up roll lubricant systems of rolling mills. The novel sealing arrangement, however, is applicable to a wide range of similar and other applications involving the sealing of relatively large bearing arrangements. In general, the sealing arrangement is useful in a great many applications where it is essential to seal a stationary member to a rotatable member. Although the invention is primarily described in a context of a rolling mill, it will be evident from the ensuing description that the invention is of general utility.

In the case of mill rolls, it is necessary to have a constantly recirculating oil flow through the journals of high load capacity oil bearings. In many operating installations, the rolling mill bearings are situated in an environment offering exposure to deluges of water or other coolant liquids and exposure to oxides and metal fines, as well as larger chips and slivers. Effective sealing is therefore necessary between the stationary bearing chocks and the rotating mill roll. Leakage of oil or other lubricants and the introduction of the aforementioned foreign matter into the lubricant system of the rolling mill cause obviously serious and costly maintenance problems. Bearing life can be drastically reduced if adequate sealing arrangements are not provided.

Prior sealing arrangements, such as illustrated in FIG. 1 and discussed in detail hereinafter, have employed a large number of component parts, which in addition to complicating initial manufacture and installation, have also rendered oil changes and dechocking both difficult and time consuming. Furthermore, these previous sealing arrangements have also failed to compensate for inevitable eccentricities in either the seal member itself, the rotating member, or the stationary member. The sealing arrangements in consequence, were subjected to rapid wearing and to aggravated leakage conditions.

One of my prior art sealing arrangements as disclosed in U.S. Pat. No. 4,063,743, issued Dec. 20, 1977, illustrates a sealing arrangement wherein the rubbing seal may be expanded with a sealant introduced within the rubbing seal members under pressure. The seal is effective, however, it requires an additional arrangement, and accordingly an expense, for injecting fluid sealant into the sealant space provided within the annular rubbing seal.

In contrast, the sealing arrangement of the present invention does not require the provision of such additional devices for injecting fluid sealant, is capable of eliminating at least two additional seals of some of the sealing arrangements of the prior art, and is otherwise devoid of the afore-described disadvantages of overcomplication and not being able to deal with eccentricities of the rotating member. The flat annular seal of the present invention replaces at least two static seals of the prior art arrangement illustrated in FIG. 1, and in addition eliminates one of the extension rings that were previously used in the prior art arrangement illustrated in FIG. 1, as will be explained in greater detail hereinafter.

The sealing arrangement of the present invention defines a generally flat annular thrower seal of elastomeric material which is annularly mounted on either the rotatable or the stationary member with an annular peripheral face portion of the thrower seal in annular rubbing engagement with a annular seal rubbing surface of the other of said members. The annular seal rubbing surface is positioned such that this elastic thrower seal is deformed in its axial direction for engaging the annular surface under rubbing seal pressure of elastic deformation.

In a more detailed embodiment of the sealing arrangement of the present invention, the stationary member will generally be configured as a bearing chock and the rotatable member may be considered as or configured as a rotatable roll member such as a mill roll or the like, which is provided with a roll member neck for journaled rotation in the bearing chock. The roll member neck is coaxially received in a sleeve secured for rotation therewith and the sleeve is, in turn, journaled for rotation in the bearing chock. An extension ring is annularly secured to one end of this sleeve and a normally flat annular thrower seal of elastomeric material is annularly engaged between this extension ring and the said one end of the sleeve to provide a seal therebetween, with the seal having inner and outer annular peripheral portions radially protruding. The inner peripheral portion of the thrower seal annularly engages the roll member neck under elastic deformation of the seal to provide a good annular static seal therebetween. A peripheral side face of the outer peripheral portion of the thrower seal annularly engages an annular seal rubbing surface of the bearing chock under elastic deformation of the seal to provide an annular rubbing seal therebetween.

In an additional embodiment of the sealing arrangement of the present invention, an annular rubbing seal means may also be positioned between the bearing chock and the afore-described extension ring to provide a second rubbing seal therebetween. This second rubbing seal and the thrower seal are relatively closely spaced to form an annular and continuous seal passage therebetween.

In one form, this annular rubbing seal means consists of a second normally flat annular thrower seal of elastomeric material annularly mounted in sealed fashion on either the extension ring or the bearing chock with an annular peripheral side face of this second thrower seal in annular rubbing engagement with a second annular seal rubbing surface of the other of the extension ring or bearing chock under elastic deformation of this second seal to provide a second annular rubbing seal between the rotatable and stationary members.

This second rubbing seal, as an alternative, may be provided in the form of a conventional annular rubbing seal or seals, such as the type illustrated in FIG. 1, to be described hereinafter.

One or more drain passages may also be provided in the bearing chock or stationary member, such that the drain passage extends therethrough in communication with the seal passage previously described between the two annular seals in order to drain off matter which may bypass the rubbing seals and lodge in this annular seal passage. In fact, this annular seal passage may be further provided with an annular dam lip on the annular surface of the stationary member or the bearing chock to provide an annular dam lip which protrudes inwardly into the seal passage. One or more of the aforedescribed drain passages may then be provided on either or both sides of the annular dam. With this configuration, lubricating oil which has escaped under the thrower seal may be drained off separately from water or other contaminates which might have entered the annular seal passage under or around the second annular rubbing seal due to the dam action created by the afore-described annular and inwardly protruding dam lip or barrier.

Other objects and advantages appear in the following description and claims.

The accompanying drawings show, for the purpose of exemplification without limiting the invention or the claims thereto, certain practical embodiments illustrating the principles of this invention wherein:

Figure 1:
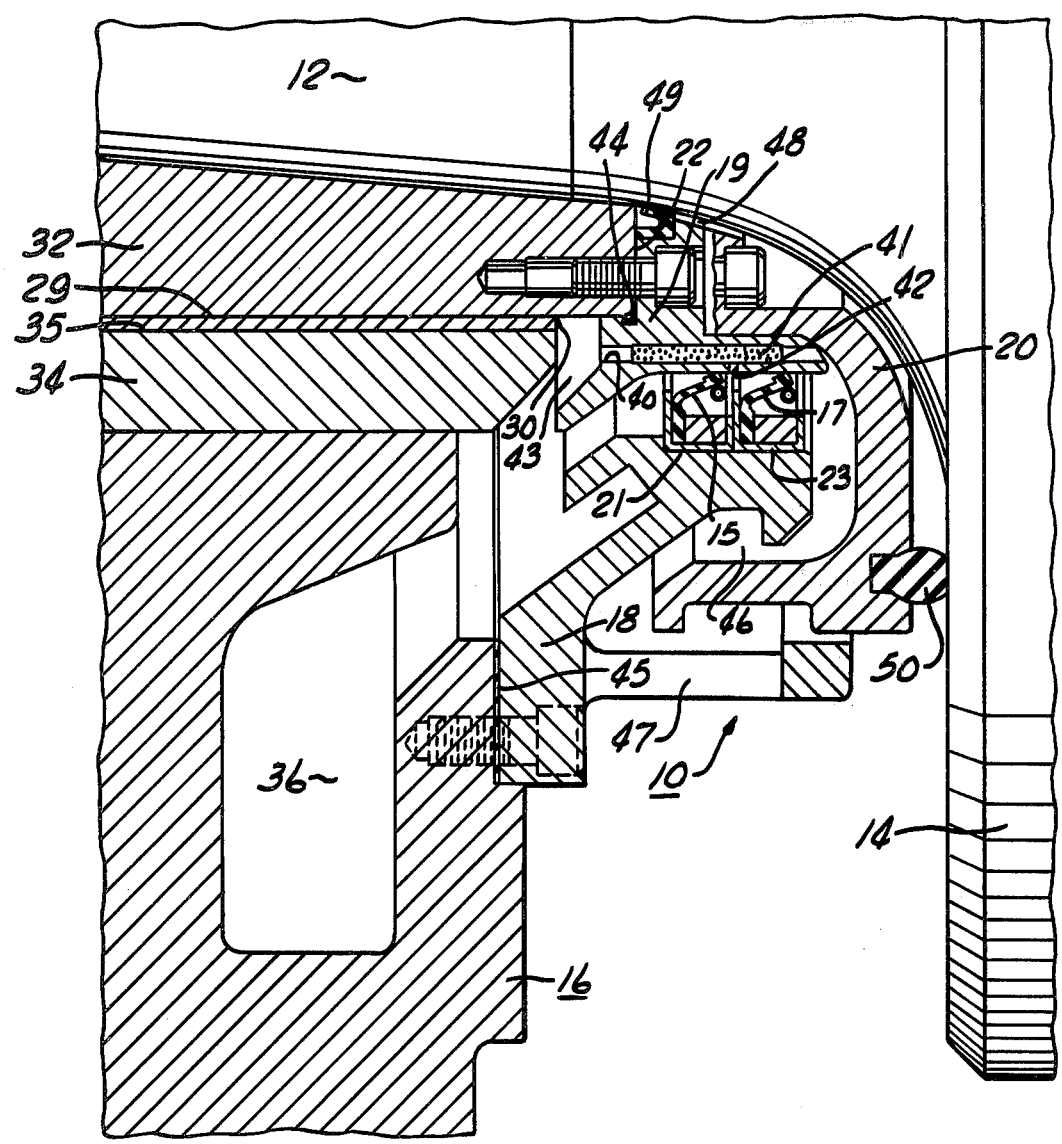
FIG. 1 is a partial, longitudinally-sectioned view of a mill roll and mill roll bearing chock, with a sealing arrangement of the prior art mounted therein.

With reference to FIG. 1, the sealing arrangement 10 shown therein is one of the prior art which will be described in order that one will more fully appreciate the sealing arrangement of the present invention as embodied in FIGS. 2 and 3. In FIG. 1, sealing arrangement 10 of the prior art is arranged for sealing a rotatable member such as roll neck 12 of mill roll 14 to a stationary member such as mill roll chock 16. More particularly, the sealing arrangement 10 is configured to seal annular stationary retainer 18, which is bolted to bearing chock 16, to rotating extension rings 19 and 20, which in turn in this instance are annularly bolted to one end 22 of tapered neck sleeve 32 which coaxially receives tapered roll neck 12 of mill roll 14 for rotation therewith.

Roll neck sleeve 32 serves as an inner bearing race and is journaled for rotation in bearing chock 16 by means of a conventional oil film bearing provided between sleeve 32 and bearing shell or sleeve 34. Bearing shell 34 acts as an outer bearing race and is lined with bushing 35 which is constructed of a relatively soft bearing material such as babbitt.

The back-up roll bearing chock 16 contains passages (not shown) which feed lubricating or bearing oil under pressure into a series of holes (not shown) through bushing 35. This lubricating oil is then discharged into slightly depressed pockets (not shown) in bushing 35, from which the oil is dragged by the rotating roll neck sleeve 32 into the load zone of the bearing where a supporting oil film is formed along the bearing surface as indicated at 29. Lubricant from oil film 29 is under high pressure and exits under pressure at the end of bushing 35 at 30 into the annular weepage space 36 enclosed between the sealing arrangement retainer 18, the bearing chock 16, and extension ring 19 to provide a sump for the inevitable lubricant leakage from the oil film space at 29, where the lubricant can be collected and recirculated under pressure back into the oil bearing system.

In order to prevent leakage of lubricant from oil film 29 between extension ring 19 and retainer 18, two stationary annular rubbing seals 15 and 17 are provided between and retained on seal retainer 18. These rubbing seals 15 and 17 can be fabricated from an elastomeric material such as Neoprene or Nitrile and are stabilized by steel band retainers 21 and 23. These rubbing seals 15 and 17 together with their reinforcing bands 21 and 23 extend continuously and circumferentially about the adjacent portions of extension ring 19.

In order to provide some lubricant to the rubbing seals 15 and 17, a small amount of the lubricant oil exiting under pressure at point 30 is permitted to flow into passage 40 and saturate fiber wick 41, which in turn, provides a small amount of lubricant continuously to rubbing seals 15 and 17 via passage 42. However, since the lubricant from oil film 29 exits at 30 under high pressure, it cannot be permitted to directly spray onto rubbing seal 15. In order to prevent this, extension ring 19 functions as a thrower ring, and is provided with an annular thrower surface 43 which deflects and throws the lubricant away from rubbing seal 15 down into the sump provided by weepage space 36. In addition, an annular O-ring seal 44 must also be provided in order to prevent leakage of lubricant from this oil film 29 between extension ring 19 and end 22 of sleeve 32. To further prevent leakage of lubricant between retainer 18 and bearing chock 16, an annular gasket 45 is provided therebetween. In addition, a labyrinth passage 46 is configured between extension ring 20 and retainer 18 to provide a circuitous path which permits escape of any lubricant or matter which may in any event pass rubbing seals 15 and 17 to drain through the large bottom drain opening 47 in retainer 18 while prohibiting or limiting entrance of contaminate liquids and solids back up through passage 46 to rubbing seals 15 and 17.

Due to the taper or roll neck 12, roll rotation and high bearing forces, a pumping action of stray lubricating oil is also created along the roll neck 12 near the fillet 48, which causes leakage and therefore requires that an effective static seal be provided. This is accomplished by annular static seal 49 and annular static seal 50.

Upon reflection, it is realized that this prior art sealing arrangement of FIG. 1 is relatively complex. First of all, the required configuration of extension ring 19 with thrower surface 43 dictates that two extension rings 19 and 20 must be provided, instead of one, for assembly of the seal arrangement. In addition, the four static seals 44, 45, 49 and 50 must be provided together with the two rubbing seals 15 and 17. The sealing arrangement of the present invention to be described hereinafter in connection with FIGS. 2 and 3 reduces the number of seals required and eliminates one of the extension rings 19 and 20, and at the same time provides a more effective seal.

Figure 2:
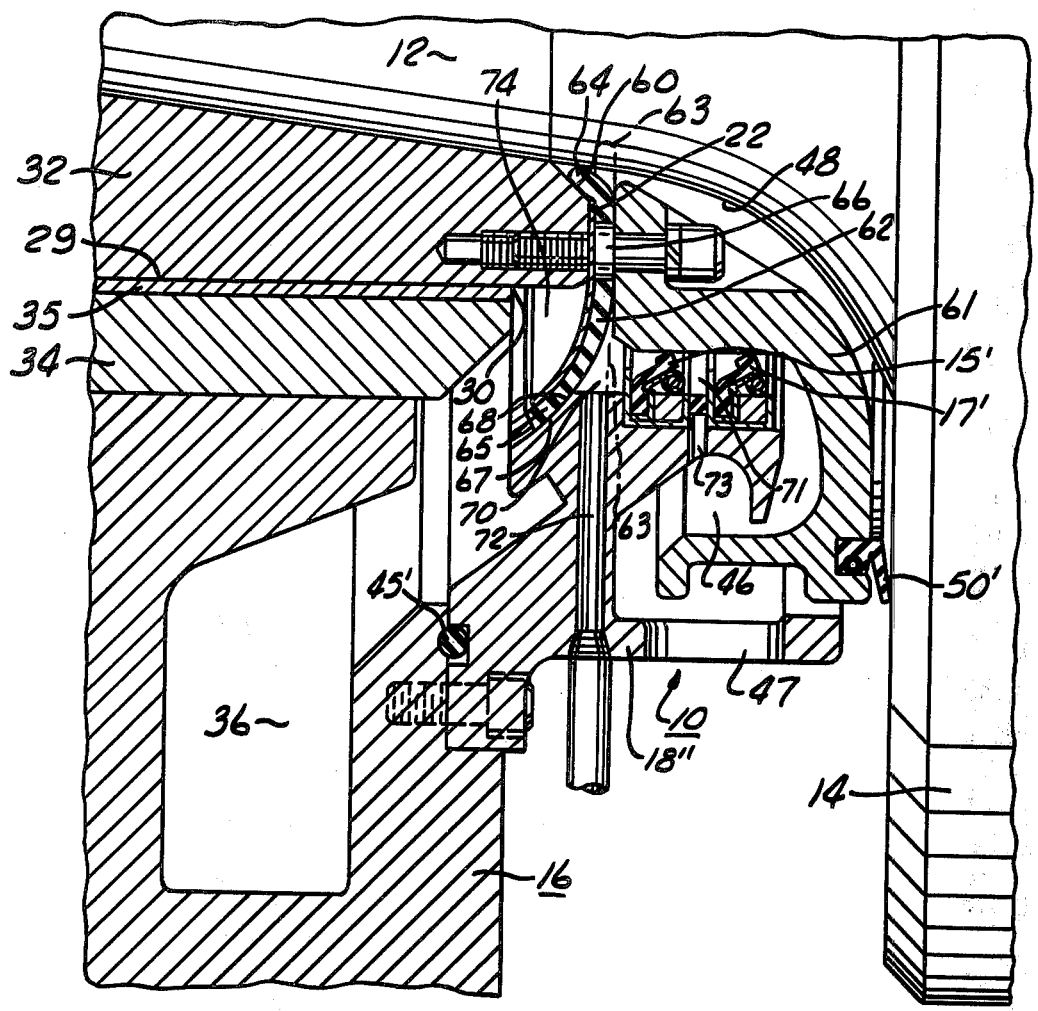
FIG. 2 is a partial, longitudinally-sectioned view of a mill roll and mill roll bearing chock, with the sealing arrangement of the present invention mounted therebetween.
Figure 3:
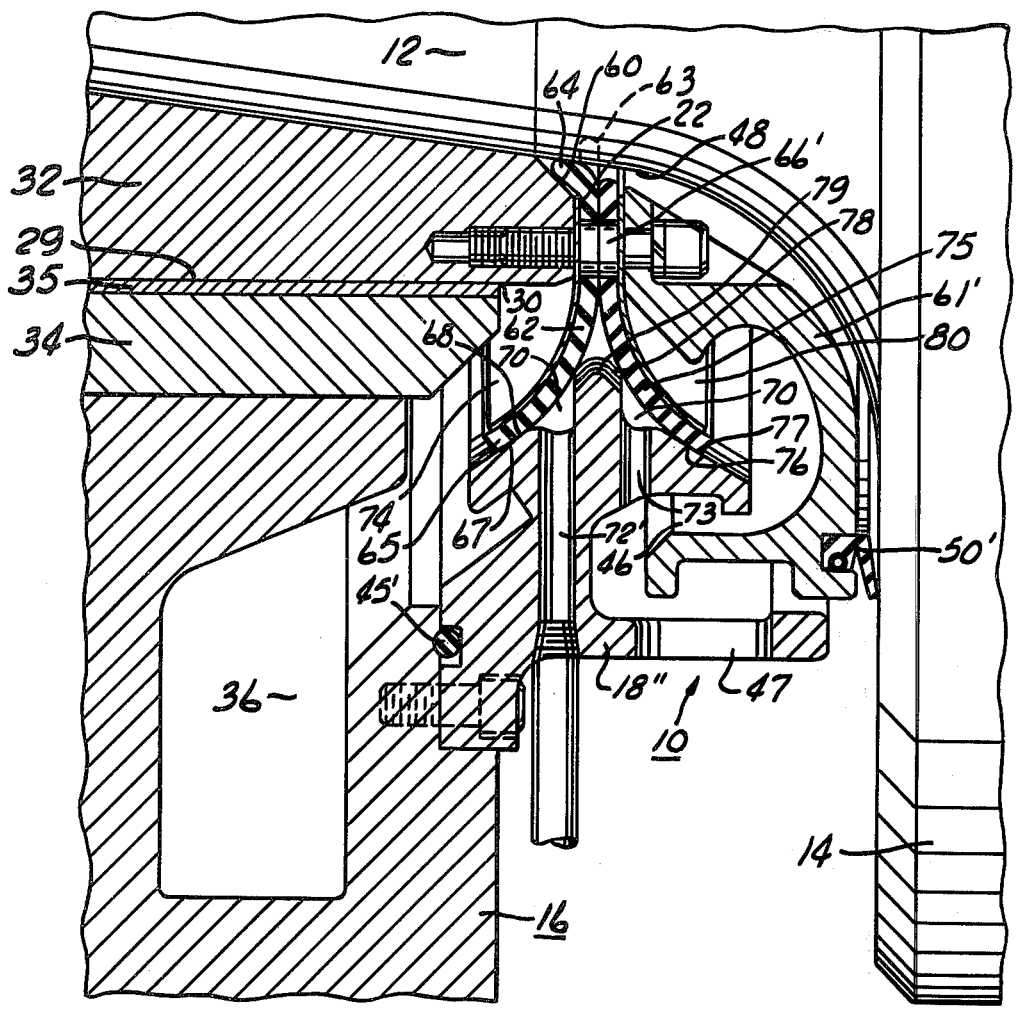
FIG. 3 is a partial, longitudinally-sectioned view of a mill roll and mill roll bearing chock, with an alternative sealing arrangement of the present invention mounted therebetween.

Referring next to FIG. 2, one embodiment of the sealing arrangement of the present invention is illustrated, and elements of FIGS. 2 and 3 which are similar to those illustrated in FIG. 1 are designated with the same reference numerals.

Referring to FIG. 2 with reference back to FIG. 1, it can be noted that the mill roll 14, bearing chock 16, bearing shell 34, bushing 35, and roll neck sleeve 32 remain the same as disclosed in FIG. 1, with the exception that the roll neck sleeve 32 has been modified by an internal annular chamfer or bevel 60. This situation also holds true with the construction of FIG. 3, and this is pointed out to indicate that the novel sealing arrangement of the present invention is readily adaptable to existing rolling mills.

Again, referring to FIG. 2 with reference back to FIG. 1, the two extension rings 19 and 20 of the sealing arrangement of FIG. 1 are replaced in FIG. 2 with a single extension ring 61 which is annularly secured to end 22 of the roll neck sleeve 32. This obviously eliminates extra parts, machining and labor in manufacturing and assembly, and this is made possible due to the novel normally flat annular thrower seal 62 of elastomeric material, such as Neoprene or Nitrile. Thrower seal 62 is designated as being normally flat, as when it is not assembled as shown in FIG. 2 in its deformed condition, it consists of a flat annular washer type configuration as indicated by the chain outline at 63.

Thrower seal 62 is annularly engaged between extension ring 61 and end 22 of roll neck sleeve 32 to provide a seal therebetween with inner and outer annular peripheral portions 64 and 65 respectively thereof radially protruding. Spacer washers 66 are also provided at each cap bolt connection in order to exactly gauge and limit the extent of compression of thrower seal 62 between extension ring 61 and end 22 of roll neck sleeve 32. The inner peripheral portion 64 of thrower seal 62 annularly engages roll neck 12 at the beginning of fillet 48 under elastic deformation to provide a good annular static seal engagement therebetween. In fact, when roll neck 12 is inserted into roll neck sleeve 32, the roll neck automatically deforms peripheral portion 64 and pinches it against the annular chamfer 60 of roll neck sleeve end 22. With static seals of the prior art, such as static seal 49 of FIG. 1, one could never be certain when this seal was assembled as to exactly how good or effective the seal was. However, with this arrangement of FIG. 2, a good static seal about roll neck 12 is absolutely insured.

Peripheral side face 67 of the outer peripheral portion 65 of thrower seal 62 annularly engages annular seal rubbing surface 68 of bearing chock 16, or more particularly of annular retainer 18' which is bolted to bearing chock 16. As can be seen in FIG. 2, outer peripheral portion 65 of the thrower seal is thus forced to engage the rubbing surface 68 under elastic deformation of the seal to provide an annular rubbing seal therebetween. This configuration of thrower seal 62 permits the elimination of thrower surface 43 of extension ring 19 shown previously in the prior art sealing arrangement of FIG. 1. By eliminating this thrower ring 43, the extension ring does not have to be constructed in two pieces as shown in FIG. 1, and it is made of a much simpler single construction 61 as illustrated in FIG. 2. The outer peripheral portion 65 of thrower seal 62 now provides a thrower shield in and of itself for internal lubricating oil exiting the oil bearing under pressure at 30 and eliminates direct splash of lubricant into the primary seal area of rubbing seals 15' and 17'.

The inside peripheral portion 64 of thrower seal 62 is forced to stretch and expand when the roll neck 12 is inserted into the tapered bearing bore of roll neck sleeve 32 and in effect provides a constant tension around the periphery of the roll neck creating a good and certain static seal at fillet 48.

As previously pointed out, the extension ring 61 incorporates the functions of two rings that were formerly used. This extension ring provides a good surface in the area of the prime rubbing seals 15' and 17', and further still creates an effective labyrinth passage 46 to eliminate the bulk of contaminates from entering this prime seal area. Extension ring 61 also carries a proven long lip V configuration seal 50' in substitution of the seal 50 of FIG. 1, and bears against the side of roll body 14 and serves as an initial stationary seal to keep outside contaminates away from the inner static seal area at fillet 48.

Again, comparing FIG. 2 to FIG. 1, annular thrower seal 62 either substitutes for or eliminates static seal 49, O-ring seal 44, thrower extension 43 and the requirement of two extension rings 19 and 20 of the prior art sealing arrangement illustrated in FIG. 1. It is thus obvious that construction is much less expensive and assembly is much faster and more secure with better ultimate sealing. Also, as will be more readily seen in conjunction with FIG. 3, thrower seal 62 can also eliminate the necessity of having two rubbing seals 15' and 17'.

Annular rubbing seals 15' and 17' are similar in construction to rubbing seals 15 and 17 of the arrangement illustrated in FIG. 1, and they provide an annular rubbing seal means positioned between the bearing chock 16 and extension ring 61 to provide a second rubbing seal therebetween, as opposed to the first rubbing seal provided by thrower seal 62. These second rubbing seals 15' and 17' and thrower seal 62 are relatively closely spaced to form an annular and continuous seal passage 70 therebetween. A second annular and continuous seal passage 71 is also formed between annular rubbing seals 15' and 17'.

Bearing chock 16 (stationary retainer 18'), is provided with an oil drain passage 72 and drains externally. Since lubricant in this seal space or passage may contain some contaminates, it is first cleaned and treated before being returned to the lubricant system for the oil bearing. This permits draining of any lubricant that might by-pass seal 62. A second drain passage 73 also extends through the stationary retainer 18' of chock 16 and provides communication between second seal passage 71 and labyrinth passage 46. Retainer 18' is also provided with a large bottom drain opening 47. This combination permits drainage of any lubricant or external liquid contaminate that might by-pass rubbing seals 15' and 17', and enter the prime rubbing seal area within second annular passage 71. The larger drain passage 47 at the bottom of the labyrinth type passage 46 permits drainage of initial contaminates that might enter the labyrinth clearance between retainer 18' and extension ring 61. With this new single rotating extension ring 61, the ring can be removed more easily and a thorough inspection of the rubbing seals and the thrower seal can be made if leakage in this area is suspected.

Thrower seal 62 is also backed up by annular reinforcing spring 74, which is annularly secured between roll neck sleeve 32 and extension ring 61 and backs up or engages with thrower seal 62 under deformation to continually urge seal 62 into annular rubbing contact with seal rubbing surface 68.

Referring next to FIG. 3, a second embodiment of the sealing arrangement of the present invention is illustrated, and those parts which are identical to the parts illustrated in FIG. 2 are designated with the same reference numerals, and those parts which are similar but slightly modified are designated with the same reference numeral but with a prime designation added to the numeral. Here, the annular rubbing seal means 15' and 17' of FIG. 2 is substituted or consists of a second normally flat annular thrower seal 75 of the same elastomeric material of thrower seal 62. Thrower seal 75 is annularly mounted in sealed fashion on extension ring 61' in the same manner as thrower seal 62, and is secured with annular peripheral side face 76 of second thrower seal 75 in annular rubbing engagement with second annular seal rubbing surface 77 of chock 16 (retainer 18") under elastic deformation to provide the second annular rubbing seal therebetween in substitution of annular rubbing seals 15' and 17' of FIG. 2. It should be realized that this second thrower seal 75 need not necessarily be secured to extension ring 61' and annularly rub against chock 16. To the contrary, other arrangements are possible wherein the thrower seal 75 can be annularly and rigidly secured to chock 16 (retainer 18") and annularly rub at its inside periphery against an annular seal rubbing surface of extension ring 61'.

In the seal arrangement of FIG. 3, the two rubbing seals or thrower rubbing seals 62 and 75 still define an annular seal passage 70 therebetween, one annular surface of which is designated as annular seal passage surface 78. This annular seal passage surface 78 of chock 16 (retainer 18") is provided with an annular dam lip 79 protruding inwardly into seal passage 78 between thrower seals 62 and 75.

In this seal arrangement, the drain 72' also drains externally, as does 72 in FIG. 2. Thus, any lubricant escaping underneath thrower seal 62 will be blocked by annular dam lip 79 from going any farther, and this lubricant will drain externally down through drain passage 72'.

The second drain passage 73 is provided on the opposite or other side of annular dam lip 79 so that any contaminates on that side of the dam lip which might enter space or passage 78 under the rubbing seal of thrower seal 75 will immediately drain to the exterior through passage 46 and large drain opening 47 provided in the bottom of retainer 18".

Thrower seal 75 is also provided with an annular reinforcing spring 80 for back-up thrower seal pressure in a fashion similar to that as provided for thrower seal 62.

I claim:

1. A sealing arrangement for sealing a stationary bearing chock to a rotatable roll member neck, said arrangement comprising a stationary bearing chock, a rotatable roll member having a roll member neck coaxially received in a sleeve secured for rotation therewith, said sleeve journaled for rotation in said bearing chock, an extension ring annularly secured to one end of said sleeve, a normally flat washer type annular thrower seal of elastomeric material annularly engaged between said extension ring and said one end of said sleeve to provide a seal therebetween with inner and outer annular peripheral portions of said thrower seal radially protruding, said inner peripheral portion of said thrower seal annularly engaging and stretched over said roll member neck under elastic deformation of said seal for annular static seal engagement therebetween, a peripheral side face of said outer peripheral portion of said thrower seal annularly engaging an annular seal rubbing surface of said bearing chock under elastic deformation of said seal to provide an annular rubbing seal therebetween.

2. The sealing arrangement of claim 1, including annular rubbing seal means positioned between said bearing chock and said extension ring to provide a second rubbing seal therebetween, said second rubbing seal and said thrower seal being relatively closely spaced to form an annular and continuous seal passage therebetween.

3. The sealing arrangement of claim 2, wherein said annular rubbing seal means consists of a second normally flat annular thrower seal of elastomeric material annularly mounted in sealed fashion on one of said extension ring and said bearing chock with an annular peripheral side face of said second thrower seal in annular rubbing engagement with a second annular seal rubbing surface of the other of said ring and said chock under elastic deformation of said second seal to provide said second annular rubbing seal therebetween.

4. The sealing arrangement of claim 3, said bearing chock having a drain passage extending therethrough in communication with said seal passage to drain off matter which may by-pass said rubbing seals and lodge in said seal passage.

5. The sealing arrangement of claim 3, wherein the inner peripheral edge of said second thrower seal is annularly engaged between said extension ring and the first said thrower seal to provide a seal therebetween with an outer peripheral side face of said second thrower seal in annular rubbing engagement with said second annular seal rubbing surface which is provided on said chock member, said rubbing seals defining an annular seal passage surface therebetween of said seal passage on said stationary bearing chock, said annular seal passage surface of said chock having an annular dam lip protruding inwardly into said seal passage between said thrower seals, and a drain passage extending through said bearing chock in communication with said seal passage on one side of said annular dam lip.

6. The sealing arrangement of claim 5, including a second drain passage extending through said bearing chock in communication with said seal passage on the other side of said annular dam lip.

7. The sealing arrangement of claim 3, including annular reinforcing spring means engaged with at least one of said thrower seals for continually urging said seal into annular rubbing contact with its corresponding seal rubbing surface.

8. The sealing arrangement of claim 1, including annular reinforcing spring means engaged with said thrower seal for continuously urging said seal into annular rubbing contact with said seal rubbing surface.

9. The sealing arrangement of claim 2, wherein said annular rubbing seal means consists of a pair of rubbing seals mounted on one of said bearing chock and said extension ring in annular rubbing engagement with a cylindrical surface of the other of said bearing chock and said extension ring, said rubbing seals being relatively closely spaced to form a second annular and continuous seal passage therebetween.

10. The sealing arrangement of claim 9, said bearing chock having an oil drain passage extending therethrough in communication with the first said seal passage.

11. The sealing arrangement of claim 10, said bearing chock having a second drain passage extending therethrough in communication with said second seal passage.

* * * * *